(12) United States Patent
Guo et al.

(10) Patent No.: US 8,175,106 B2
(45) Date of Patent: *May 8, 2012

(54) FAST AND AUTOMATIC SELF-FORMING MESHING TOPOLOGY TO INTEGRATE WITH WIRED NETWORKS

(75) Inventors: Ming-Wang Guo, Hsinchu (TW); Jen-Sheng Huang, Hsinchu (TW); Chun-Fu Wang, Hsinchu (TW); Ying-Yung Chen, Hsinchu (TW); Shang-I Huang, Hsinchu (TW); Yao-Chang Hsieh, Hsinchu (TW); Yi-Hsien Cho, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,517

(22) Filed: May 4, 2010

(65) Prior Publication Data

US 2010/0214961 A1 Aug. 26, 2010

Related U.S. Application Data

(63) Continuation of application No. 11/134,478, filed on May 23, 2005, now Pat. No. 7,738,470.

(51) Int. Cl.
*H04L 12/28* (2006.01)
*H04W 4/00* (2009.01)

(52) U.S. Cl. ......... 370/406; 370/338; 370/328; 370/389

(58) Field of Classification Search .......... 370/338, 370/328, 254, 406, 400, 389
See application file for complete search history.

(56) References Cited

U.S. PATENT DOCUMENTS

| | | | |
|---|---|---|---|
| 5,018,133 | A | 5/1991 | Tsukakoshi et al. |
| 6,856,591 | B1 | 2/2005 | Ma et al. |
| 7,093,027 | B1 | 8/2006 | Shabtay et al. |
| 2002/0110105 | A1 | 8/2002 | Awater et al. |
| 2003/0235170 | A1 | 12/2003 | Trainin |
| 2004/0142699 | A1 | 7/2004 | Jollota et al. |
| 2004/0169583 | A1 | 9/2004 | Meier |
| 2005/0030922 | A1 | 2/2005 | Lee et al. |
| 2005/0141468 | A1 | 6/2005 | Kim et al. |
| 2006/0045033 | A1 | 3/2006 | Fukuhara |
| 2006/0128384 | A1 | 6/2006 | Jagadeesan et al. |
| 2006/0146831 | A1 | 7/2006 | Argyropoulos et al. |
| 2006/0153151 | A1 | 7/2006 | Huang et al. |
| 2006/0187878 | A1 | 8/2006 | Calhoun et al. |
| 2006/0239223 | A1 | 10/2006 | Sherman et al. |
| 2006/0268715 | A1 | 11/2006 | Zuniga et al. |
| 2007/0189249 | A1 | 8/2007 | Gurevich et al. |

*Primary Examiner* — Christopher M Brandt
(74) *Attorney, Agent, or Firm* — WPAT., P.C.; Justin King

(57) ABSTRACT

The present invention applies management frame defined in IEEE 802.11 standard to a wireless distribution system (WDS) mode by adding an information element (IE) into the management frame, which enables any access point (AP) in WDS to maintain IE based on its own setting and state, then send IE via the management frame for providing state of the AP under WDS mode, determine whether a physical link (i.e., a wireless link between APs) should be established therewith based on received IE, and maintain the established physical link through the wireless management frame in a real time manner. Thus, the existence and necessity of the physical link between different APs in WDS can be determined correctly.

4 Claims, 14 Drawing Sheets

FAST AND AUTOMATIC SELF-FORMING MESHING TOPOLOGY TO INTEGRATE WITH WIRED NETWORKS

FIELD OF THE INVENTION

The present invention relates to a meshing topology, more particularly to a meshing topology established under IEEE 802.11 for providing the original service functions of wireless station and wireless distribution system in between different access points through the existing wireless distribution system and Rapid Spanning Tree Protocol, and self-forming the meshing topology automatically under a frame of wired network so as to form a more stable, flexible, expansible and considerable mechanism for integrating the frames of both wired and wireless networks.

BACKGROUND OF THE INVENTION

The Internet is widely available. IEEE 802.11 standard covers wireless networks and is the dominant standard of wireless networking. Much time and money have spent on it by both academic organizations and related industries throughout the world. Wireless networking also expands its applications in many fields in a fast pace. Further, the wireless network market is very competitive. Thus, both academic organizations and related industries concentrate on how to learn from experience, foresee the trend of wireless networking, and develop novel, compatible, and advanced products in order to survive in this competitive market and contribute significantly to the advancement of wireless networking.

General users gradually are not satisfied with service provided to a station (STA) by a conventional wireless access point (AP). Industry of the art is not satisfied with it either. Thus, it is a great potential to improve the performance of AP such that different APs are able to interconnect through a wireless distribution system (WDS) and even become a part of wireless networking equipment. WDS is part of IEEE 802.11 standard. APs are configured to interconnect through a wireless network infrastructure. Thus, range of wireless networking can be expanded by APs. Typically, in a case of different APs interconnected through WDS, meshing topology of physical link established between the APs is determined by manually setting an address of media access control (MAC). Such established topology is not flexible and its infrastructure is fixed (i.e., no expansibility). Moreover, the whole wireless network meshing topology may be tampered if one AP is off-line or power off. As a result, a loop is formed and thus the network is disconnected. In the known WDS operating mode, no standard has been stipulated. Also, some types of WDS cannot effectively cooperate with existing Ethernet. Further, it is a tedious procedure of constructing meshing topology if wired networks are not considered. Furthermore, it is not flexible. Rapid spanning tree protocol (RSTP) is IEEE 802.1W standard for industry. A wired link can be established on RSTP based on a network switch. A feasible meshing topology can be formed on Layer 2 network. In the past, meshing topology is employed in wired networks for dynamically forming a topology infrastructure with respect to Layer 2 network having a physical link. In the past, RSTP is not employed in wireless networking. This is because a wireless network has characteristics different from that of a wired network. A wireless network cannot dynamically provide the current wireless physical link to RSTP. Thus, meshing topology without loop cannot be formed by RSTP. Hence, the need for improvement still exists.

SUMMARY OF THE INVENTION

After considerable research and experimentation, a fast and automatic self-forming meshing topology to integrate with wired networks according to the present invention has been devised so as to overcome the above drawback of the prior art (e.g., no integration of AP and wired networks). By utilizing the present invention, different APs under WDS mode can fast and automatically form meshing topology and such forming is more flexible without tediously setting each machine. As a result, network communication quality is improved, integration with wired networks is effected, and the requirement of establishing backbone in an organization or metropolis is fulfilled.

In one aspect of the present invention, management frame for AP defined in IEEE 802.11 standard is employed under WDS mode. The management frame has an added information element (IE). Thus, any AP is required to maintain IE based on its own setting and state and send IE via a management frame. Further, state of the AP under WDS mode is provided such that any AP is aware of conditions of other APs in WDS and is adapted to determine whether a physical link (i.e., a wireless link between APs) should be established therewith based on received IE. The wireless link is thus a physical link for communicating data frames among different APs. As a result, a real time maintenance of the established physical link can be achieved through the wireless management frame by any AP. Moreover, existence and necessity of the physical link can be determined correctly. By utilizing the present invention, drawbacks inherent with wireless networking (e.g., ones inherent with wired networking but not associated with wireless networking due to different transmission medium) are substantially eliminated.

In another aspect of the present invention, an AP is equipped with bridge for routing. Thus, a frame irrespective of being sent through a wired network or a wireless network, is able to reach a desired destination through the APs. This routing feature is not possessed by prior AP. By utilizing the present invention, a fast self-forming meshing topology in IEEE 802.11 meshing standard for integrating with wired networks is dynamically formed and it is adapted to automatically extend.

In a further aspect of the present invention, the idea of group is introduced for solving problems such as poor quality due to air being served as transmission medium, network being prohibited from unlimited extension due to interference, or the like associated with wireless networking. By utilizing the present invention, a private network is able to form a meshing topology in a private wireless network by itself without involving other network equipment. Further, APs in a group are adapted to provide a dynamic backup to APs in a different group.

The above and other objects, features and advantages of the present invention will become apparent from the following detailed description taken with the accompanying drawings.

DETAILED DESCRIPTION OF THE PREFERRED EMBODIMENTS

Three types of frame are defined in IEEE 802.11 standard. Namely, management frame, data frame, and control frame. The management frame serves as communication frame between AP and STA. Information can be exchanged between AP and STA through management frame in order to determine whether a physical link should be established or not. The invention applies management frame to different APs based on functionality of the management frame. As such, a physical link between any two APs (i.e., wireless link therebetween) can be established initially. The management frame utilizes an information element (IE) thereof for effecting communication. Thus, an AP is required to maintain IE based on its own setting and state and send IE via a management frame in due time. Thus, the invention adds an IE and which is adapted to provide state of AP under WDS mode. Therefore, any AP is aware of conditions of other APs in WDS and is adapted to determine whether a physical link should be established therewith based on received IE. As a result, a real time maintenance of the established physical link can be achieved. In the invention, such mechanism is called alpha wireless meshing networking (AWMN). An AP for supporting AWMN is called AWMN device (AWMND).

Figure 1:
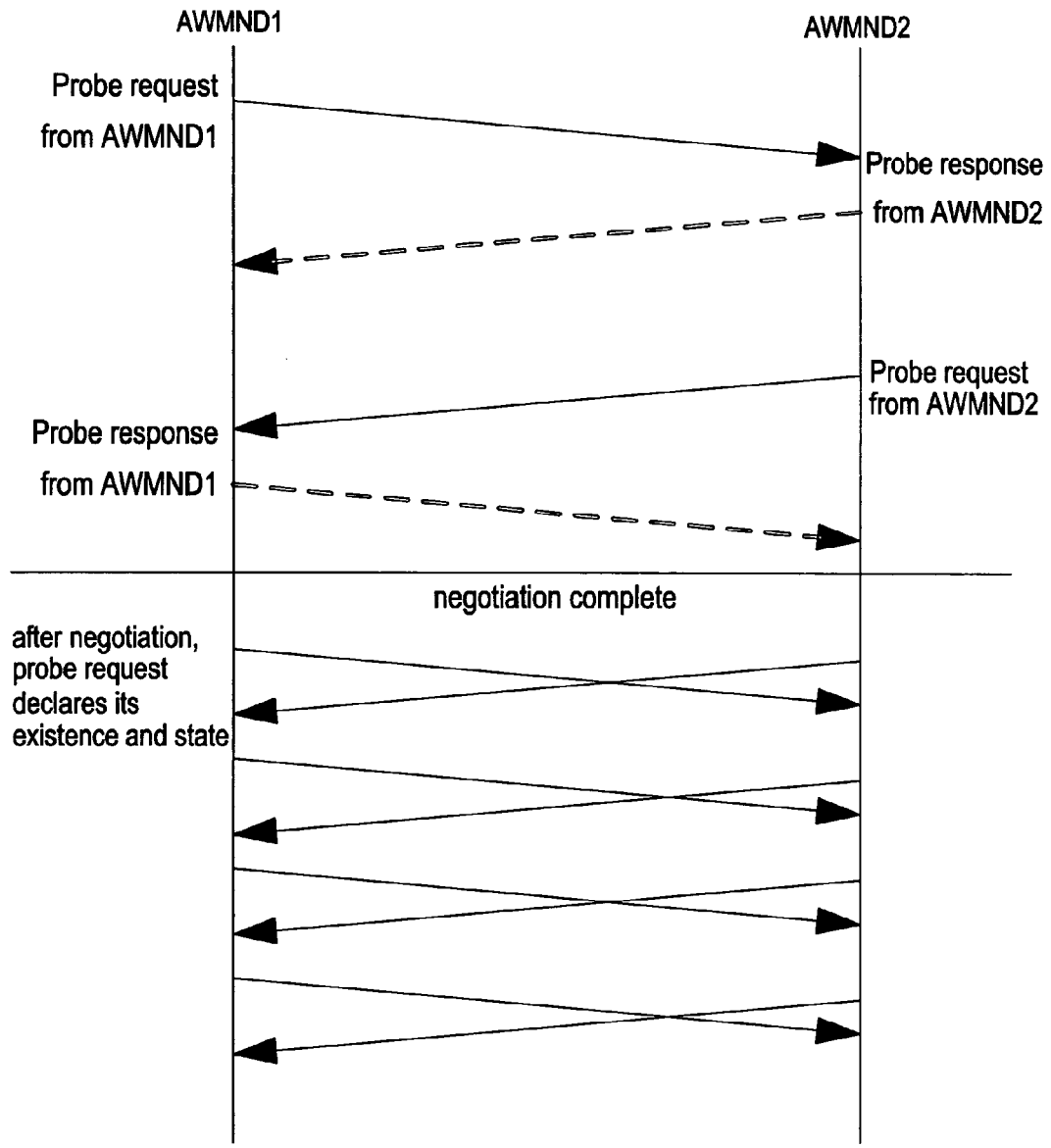
FIG. 1 presents a feasible signaling in two different AWMNDs according to the invention.

Referring to FIG. 1, it presents a feasible signaling in two different AWMNDs according to the invention. After powering on AWMND1, the AWMND1 regularly sends a probe request frame having a new IE by broadcasting. The new IE can also be sent via any of other management frames. In the invention, it is called alpha meshing element (AME). AME serves to declare itself as an AP for supporting AWMN and is adapted to send out its current state. Thus, it is also called Hello IE since the probe request frame is also a broadcast frame. All APs supporting AWMN can receive the probe request frame and each is capable of analyzing information provided by Hello IE and storing the real time information in a bridge table (BT). At the same time, a probe response frame is sent back as a reply to the probe request frame from AWMND1 after another AWMND2 receiving the probe request frame. Referring to FIG. 1 again, whether a wireless link between AWMND1 and AWMND2 should be established can be determined after finishing negotiation. As stated above, a probe request frame is sent between AWMND1 and AWMND2 regularly by broadcasting. Thus, two AWMNDs are able to determine whether a specific wireless link exists or not. Further, a new meshing topology can be established via RSTP. In other embodiments of the invention, after receiving the probe request frame another AWMND2 is able to send back a response frame in a technique other than above as a reply to the probe request frame from AWMND 1.

Figure 2:
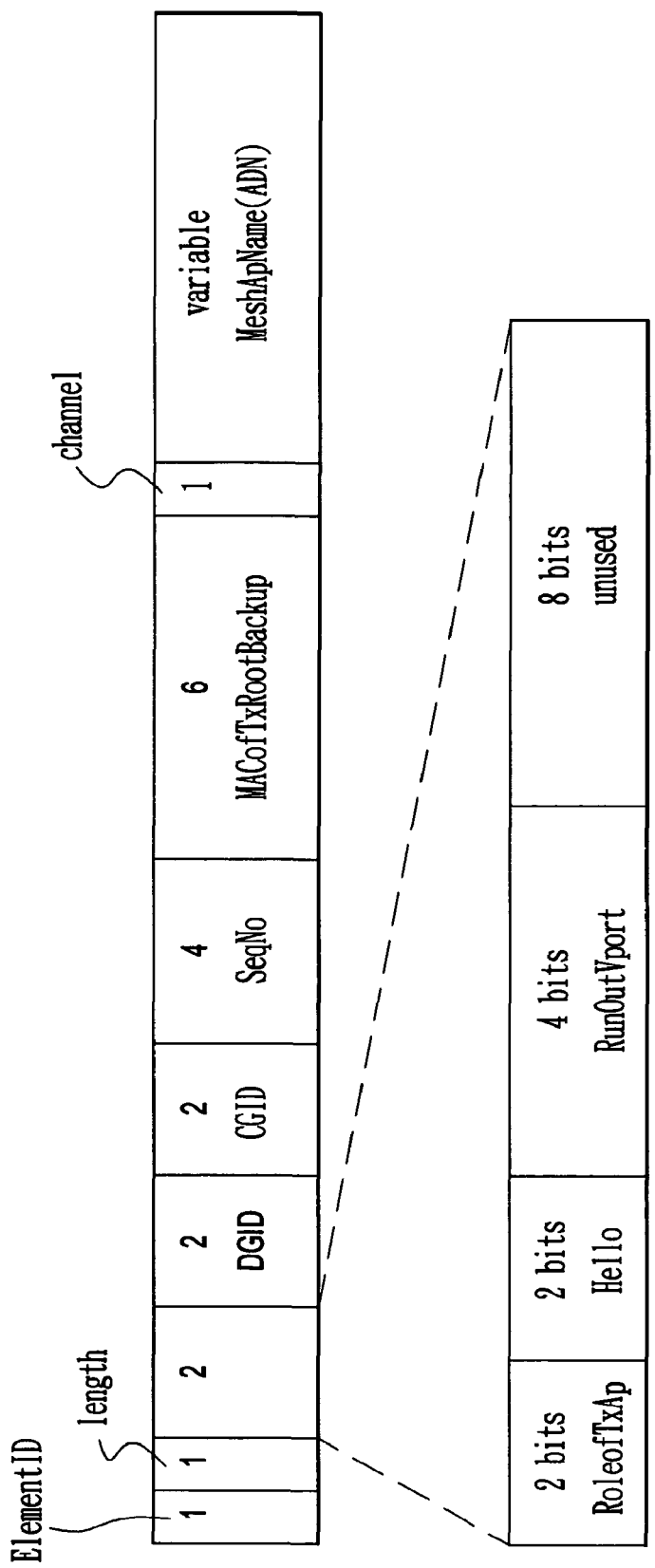
FIG. 2 depicts Hello IE format and contents in respective fields thereof.

Referring to FIG. 2, it depicts received Hello IE format and contents in respective fields thereof according to the invention. By understanding them, each AWMND is able to determine whether a wireless link should be established based on the received Hello IE. The Hello IE format and contents in respective fields thereof are defined below:

a) Default group ID (DGID): In AWMN of the invention, each AWMND has its default ID and which is set by a user. This means that each AWMND has a chance of highest priority of joining a specific AWMN group.

b) Current group ID (CGID): In AWMN all AWMNDs eventually join a specific group and an ID of the specific group is CGID.

c) Default role (DR): In AWMN, each AWMND has its DR and which is set by a user. This means that each AWMND has a chance of highest priority of playing a role in a specific AWMN group.

d) Current role (CR): In AWMN, each AWMND plays a specific role during its operation.

e) AWMN device name (ADN): For the purpose of effectively managing all AWMNDs in AWMN, each AWMND has a device name and which is set by a user. ADN has a string length between 1 bit and 96 bit.

f) Local device information database (LDID): LDID is adapted to store state of an AWMND. Hello IE written into a probe request frame is based on LDID.

g) Received hello information database (RHID): RHID is adapted to store latest and meaningful Hello IE sent from other AWMNDs. RHID is further adapted to diagnose received Hello IE for determining whether it is legal based on its CR. This means that states of all AWMNDs can be determined based on received Hello IE.

h) Counter and threshold counter center (CTCC): CTCC is adapted to maintain a specific value and threshold for carrying out a fast negotiation between AWMNDs. CTCC is further adapted to facilitate forming AWMN topology effectively.

i) BT: BT is adapted to store all received Hello IEs and site survey results.

Referring to FIG. 2 again, Hello information will be used only when an auto-topology provided by the invention is enabled by user. By utilizing Hello IE, negotiation among all AWMNDs is made possible. As a result, a wireless topology can be established automatically without being set by user. Contents in respective fields of the added Hello IE are detailed below:

a) ElementID field (1 byte ID field): It is adapted to store ID of Hello IE. This is required according to IEEE standard. Content of ElementID field is required to be different from used ID. It is assigned as 88 by the invention.

b) Length field (1 byte): It is adapted to store total length of Hello IE. This is required according to IEEE standard. Value of Length field represents the number of bits from third byte of an ID to the end thereof.

c) RoleofTxAp field (2 bit role of AP): It is adapted to show CR of AWMND. Either RoleofTxAp field or Hello field (i.e., information transmission field as detailed later) is a requisite field. That is, AWMND can represent its CR in value of RoleofTxAp field. RoleofTxAp field has a value of 0 when AWMND is in an initial pure state. RoleofTxAp field has a value of 1 when AWMND is in a root state. RoleofTxAp field has a value of 2 when AWMND is in a backup state. RoleofTxAp field has a value of 3 when AWMND is in a pure or escape pure state.

d) Hello field (2 bit as information transmission field): It is adapted to represent that the IE is sent from which role of AP. Either Hello field or RoleofTxAp field is a requisite field. Hello field is adapted to show whether a probe request has been created or duplicated based on CR of AWMND. Hello field has a value of 0 when AWMND is in an initial pure state. Hello field has a value of 1 when AWMND is in a root state. Hello field has a value of 2 when AWMND is in a backup state. Hello field has a value of 3 when AWMND is in a pure or escape pure state.

e) RunOutVport field (4 bit as wireless link establishment field): It is a new field having a fixed length. It is adapted to represent whether AWMND is able to establish a new wireless link. That is, whether AWMND has the capability of creating more physical wireless links. If yes, RunOutVport field has a value of 0. Otherwise, it has a value of 1. However, the capability of establishing a new wireless link depends on the number of established wireless links and the provision of RunOutVport field only aims at balancing load. Thus, RunOutVport field is not requisite.

f) Unused field (8 byte): It represents an unused field.

g) DGID field (2 byte as Default group ID): It is a new field having a fixed length. DGID field represents ID of a group that AWMND is expected to join the group. That is, a group has the highest priority of joining. However, a predetermined group is not necessary to be the last joining group in practice. DGID field only provides priority. Thus, DGID field is not requisite and has a value in the range of 1 to 0xffff.

h) CGID field (2 byte as current group ID): It is a new field having a fixed length. CGID field represents an added group in AWMND operation. Other AWMNDs are aware of whether a specific group exists and operates normally by knowing value of CGID field. CGID field is requisite and has a value of either 0 when AWMND is in an initial pure state or in the range of 1 to 0xffff when AWMND is in a steady state.

i) SeqNo field (4 byte as sequence field): It is a new field having a fixed length. SeqNo field represents a serial number of a latest available IE as an indication of the existence of a specific group. That is, value of SeqNo field is increased by one after a root AP sending a management frame having IE. Other APs of the same group take a maximum value of received SeqNo field as content to be sent. SeqNo field is a requisite field. However, value of SeqNo field means nothing when AWMND is in an initial pure state.

j) MACofTxRootBackup field (6 byte as root AP MAC field): It is a new field having a fixed length: MACofTxRootBackup field represents value of MAC of root AP in AWMND group and it is a requisite field. MACofTxRootBackup field has a value of 0 when AWMND is in an initial pure state. MACofTxRootBackup field has a value equal to value of MAC of AWMND in its root state when AWMND is in a pure or escape pure state. MACofTxRootBackup field has a value equal to value of MAC of local device when AWMND is in a backup state. MACofTxRootBackup field has a value equal to value of MAC of local device when AWMND is in a root state.

k) Channel field (1 byte as channel field): It is a new field having a fixed length: Channel field represents an operating channel of group. Channel field is not a requisite field since there is similar channel information available in other management frames.

l) MashApName field (i.e., AP management name field): It represents AP name for mashing with AWMND. Network management staff can facilitate network management by means of MashApName field. It is a new field having a variable length depending on length of a given name. Maximum length of MashApName field is 96 byte. MashApName field is not a requisite field.

Figure 3:
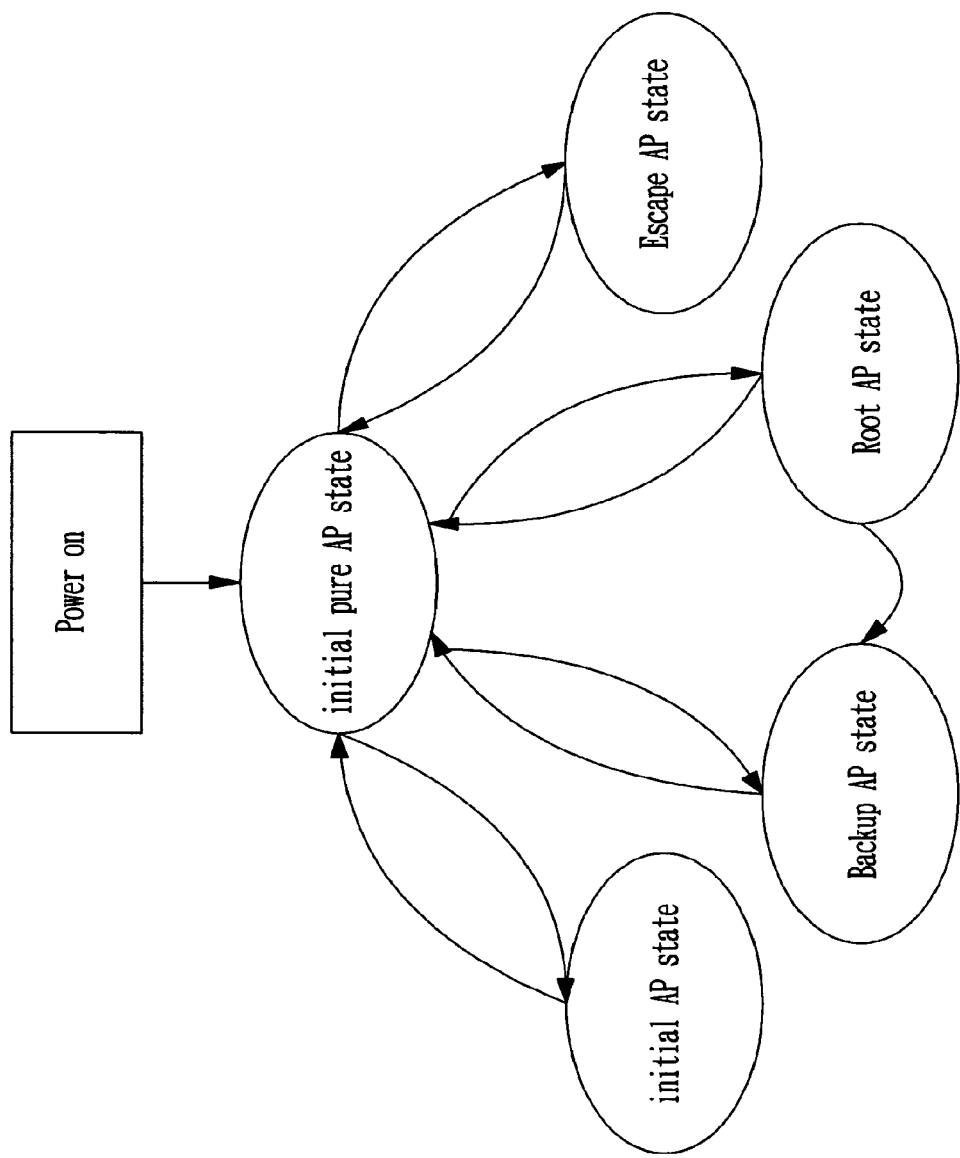
FIG. 3 depicts a state machine of AWMND and state changes thereof.

Referring to FIG. 3, it depicts a state machine of AWMND and state changes thereof.

Transit state: AWMND is in a transit state when AWMND is powered on or AWMND is not in a steady state due to trigger in certain conditions. In AWMN, transit state is an initial pure AP state. Thus, an initial pure AP state cannot be mapped to a specific AP role.

Steady state: This is not a transit state. Steady state as defined by the invention means that AWMND will remain in a steady condition after fulfilling certain needs. Steady state belongs to one of four states as follows:

a) Pure AP state: It is mapped to a current pure AP role.

b) Backup AP state: It is mapped to a current backup AP role.

c) Root AP state: It is mapped to a current root AP role.

d) Escape pure AP state: It is also mapped to a current pure AP role.

Above description of steady state focuses on current state. Four items are employed by the invention for clearly describing respective states and defining characters of respective states.

(1) State name: It represents title of a state.

(2) Internal status: It represents statuses of local devices.

(3) External status: It represents statuses of other AWMNDs.

(4) Hello pattern: It represents Hello IE format of an added probe request frame.

The invention determines state of each AWMND and determines whether a wireless link has been established based on Hello IE in a probe request frame sent from each AWMND or a received Hello IE. For AWMND in an in initial pure state, items thereof are defined as follows:

(1) State name: It represents an initial pure state.

(2) Internal status: In Hello IE, value of DGID field is equal to user setting, value of CGID field is equal to INIT_CGID and which has a value of 0, value of DR is equal to user setting, value of CR is equal to INIT_CR and which has a value of 0, and value of escape mode is equal to 0.

(3) External status: It means one of the following conditions including a probe request frame not received, no Hello IE in a received probe request frame, received Hello IE being in an initial pure state, and AWMND being in a plug in state with Ethernet but an uptime ended at an initial threshold $Threshold_{init}$ must be waited prior to entering a steady state.

(4) Hello pattern: In a Hello IE format, contents in respective fields are as follows. Value of RoleofTxAp field is 0, value of Hello field is 0, value of RunoutofVport field is 0, value of Unused field is 0, value of DGIDofTxAP field is based on user configuration, value of CGIDofTxAP field is 0, value of SeqNo field is based on counter of AWMND, value of MACofTxRootBackup field is NULL, value of Channel field is an operating channel of AWMND, and value of MashApName field is based on user configuration.

For each AWMND in a pure state, items thereof are defined as follows.

(1) State name: It represents an initial pure state.

(2) Internal status: In Hello IE, value of DGID field is equal to user setting, value of CGID field is equal to value of DGID field, value of DR is equal to user setting, value of CR is equal to pure AP, value of escape mode is equal to 0, and Ethernet is in an off state.

(3) External status: AWMND will maintain values based on the following expression when AWMND begins to receive a probe request frame.

$$HelloSeq_{last} + Buffer_{seq1} > LocalCounter_{last} + Variance_{pure}$$

where $HelloSeq_{last}$ means value of a freshest SeqNo received by other AWMNDs (i.e., value of SeqNo field) in which a corresponding CGID field of Hello IE (i.e., AME IE) is the same as CGID field of AWMND, $Buffer_{seq1}$ means a constant, $LocalCounter_{last}$ means current counter maintained by a local device when a $HelloSeq_{last}$ received, $Variance_{pure}$ means $HelloSeq_{pure\_1st} - LocalCounter_{pure\_1st}$, $HelloSeq_{pure\_1st}$ means a hello sequence number when a first legal probe request frame is received by a local device, and $LocalCounter_{pure\_1st}$ means a local counter value of a local device when a $HelloSeq_{pure\_1st}$ is received.

(4) Hello pattern: In Hello IE format, contents in respective fields are as follows. Value of RoleofTxAp field is 3, value of Hello field is 3, value of RunoutofVport field is based on virtual port status of a local device, value of Unused field is 0, value of DGIDofTxAP field is based on user configuration, value of CGIDofTxAP field is equal to value of DGIDofTxAP field, value of SeqNo field is equal to $HelloSeq_{last}$, value of MACofTxRootBackup field is equal to value of MAC of root device in a joined group, value of Channel field is an operating channel of AWMND, and value of MashApName field is based on user configuration.

For each AWMND in a backup state, items thereof are defined as follows:

(1) State name: It represents a backup state.

(2) Internal status: In Hello IE, value of DGID field is equal to user setting, value of CGID field is equal to value of DGID field, value of DR is equal to user setting, value of CR is equal to backup AP, value of escape mode is equal to 0, and Ethernet is in an on state.

(3) External status: AWMND will maintain values based on the following expression.

$$HelloSeq_{last} + Buffer_{seq1} > LocalCounter_{last} + Variance_{pure}$$

where $HelloSeq_{last}$ means value of a freshest SeqNo received by other AWMNDs (e.g., one having the same value as CGID field), $Buffer_{seq1}$ means a constant, $LocalCounter_{last}$ means current counter maintained by a local device when a $HelloSeq_{last}$ received, $Variance_{pure}$ means $HelloSeq_{pure\_1st} - LocalCounter_{pure\_1st}$, $HelloSeq_{pure\_1st}$ means a hello sequence number when a first legal probe request frame is received by a local device, and $LocalCounter_{pure\_1st}$ means a local counter value of a local device when a $HelloSeq_{pure\_1st}$ is received.

(4) Hello pattern: In a Hello IE format, contents in respective fields are as follows. Value of RoleofTxAp field is 2, value of Hello field is 2, value of RunoutofVport field is based on virtual port status of a local device, value of Unused field is 0, value of DGIDofTxAP field is based on user configuration, value of CGIDofTxAP field is equal to value of DGIDofTxAP field, value of SeqNo field is based on a local counter, value of MACofTxRootBackup field is equal to value of MAC of a local device, value of Channel field is an operating channel of AWMND, and value of MashApName field is based on user configuration.

For each AWMND in a root state, items thereof are defined as follows.

(1) State name: It represents a root AP state.

(2) Internal status: In Hello IE, value of DGID field is equal to user setting, value of CGID field is equal to value of DGID field, value of DR is equal to user setting, value of CR is equal to root AP, value of escape mode is equal to 0, and Ethernet is in an on state and which means AWMND is connected to Ethernet. Otherwise, it means AWMND is not connected to Ethernet.

(3) External status: No other root AWMND has the same group ID. Value of SeqNo field sent from other AWMNDs having the same group ID is less than or equal to value of local SeqNo field.

(4) Hello pattern: In a Hello IE format, contents in respective fields are as follows. Value of RoleofTxAp field is 1, value of Hello field is 1, value of RunoutofVport field is based on virtual port status of a local device, value of Unused field is 0, value of DGIDofTxAP field is based on user configuration, value of CGIDofTxAP field is equal to value of DGIDofTxAP field, value of SeqNo field is based on a local counter, value of MACofTxRootBackup field is equal to value of MAC of a local device, value of Channel field is an operating channel of AWMND, and value of MashApName field is based on user configuration.

For each AWMND in an escape pure state, items thereof are defined as follows.

(1) State name: It represents an escape pure state. Escape pure state and pure state are the same from the point of view of a user.

(2) Internal status: In Hello IE, value of DGID field is equal to user setting, value of CGID field is equal to value of a joined group, value of DR is equal to user setting, value of CR is equal to pure AP, value of escape mode is equal to 1, and Ethernet is in an off state.

(3) External status: AWMND will maintain values based on the following expression.

$$HelloSeq_{last\_Escape} + Buffer_{seq2} > LocalCounter_{last\_Escape} + Variance_{pure\_Escape}$$

where $HelloSeq_{last\_Escape}$ means value of a freshest SeqNo (e.g., one having a value different from that of CGID field and adapted to join a local device) received by other AWMNDs, $Buffer_{seq2}$ means a constant, $LocalCounter_{last\_Escape}$ means current counter maintained by a local device when a $HelloSeq_{last\_Escape}$ is received, $Variance_{pure}$ means $HelloSeq_{pure\_Escape\_1st} - LocalCounter_{pure\_Escape\_1st}$, $HelloSeq_{pure\_Escape\_1st}$ means a hello sequence number when a first legal probe request frame is received by a local device, and $LocalCounter_{pure\_Escape\_1st}$ means a local counter value of a local device when a $HelloSeq_{pure\_Escape\_1st}$ is received.

(4) Hello pattern: In a Hello IE format, contents in respective fields are as follows. Value of RoleofTxAp field is 3, value of Hello field is 3, value of RunoutofVport field is based on virtual port status of a local device, value of Unused field is 0, value of DGIDofTxAP field is based on user configuration, value of CGIDofTxAP field is equal to ID of a joined group, value of SeqNo field is equal to $HelloSeq_{last\_Escape}$, value of MACofTxRootBackup field is equal to value of MAC of a local device, value of Channel field is an operating channel of AWMND, and value of MashApName field is based on user configuration.

In a case of AWMND in a transit state, following requirements are imposed by the invention depending on different transit states.

1) For AWMND changed from initial pure AP to pure AP, value of CGID field of received Hello IE is required to be equal to that of DGID field of a local device, value of MACofTxRoot field is required to be not equal to 0 or value of MAC of the local device, and Ethernet is required to plug off from the local device.

2) For AWMND changed from pure AP to initial pure AP, Ethernet is plugged in a local device or $HelloSeq_{last}+Buffer_{seq1}<LocalCounter_{last}+Variance_{pure}$.

3) For AWMND changed from initial pure AP to backup AP, value of CGID field of received Hello IE is required to be equal to that of DGID field of a local device, value of MACofTxRoot field is required to be not equal to 0 or value of MAC of the local device, and Ethernet is required to plug in the local device.

4) For AWMND changed from backup AP to initial pure AP, Ethernet is plugged off a local device or $HelloSeq_{last}+Buffer_{seq1}<LocalCounter_{last}+Variance_{pure}$.

5) For AWMND changed from initial pure AP to root AP, value of CGID field of received Hello IE different from that of a local device, and AWMND counter is equal to $Threshold_{Root}$, Ethernet is required to plug in the local device, and $Threshold_{Root}$ is a threshold and its cost depends on a default AP role. Basically, default root AP has a smallest cost and default root pure AP has a largest cost.

6) For AWMND changed from root AP to initial pure AP, Ethernet is plugged off.

7) For AWMND changed from initial pure AP to escape pure AP, escape counter is required to be larger than $Threshold_{Escape}$, escape flag is required to be enabled, Ethernet is required to plug off from a local device, value of CGID field of received Hello IE is required to be different from that of DGID field of the local device, and value of MACofTxRoot field of received Hello IE is required to be not equal to 0 or value of MAC of the local device.

8) For AWMND changed from escape pure AP to initial pure AP, Ethernet is plugged in a local device or $HelloSeq_{last\_Escape}+Buffer_{seq2}<LocalCounter_{last\_Escape}+Variance_{pure\_Escape}$.

9) For AWMND changed from root AP to backup AP, Ethernet is plugged in a local device, a received Hello IE has a legal, senior value of SeqNo field, and the received Hello IE has a value of CGID field of a local device. In other words, a senior root AP exists.

Figure 4:
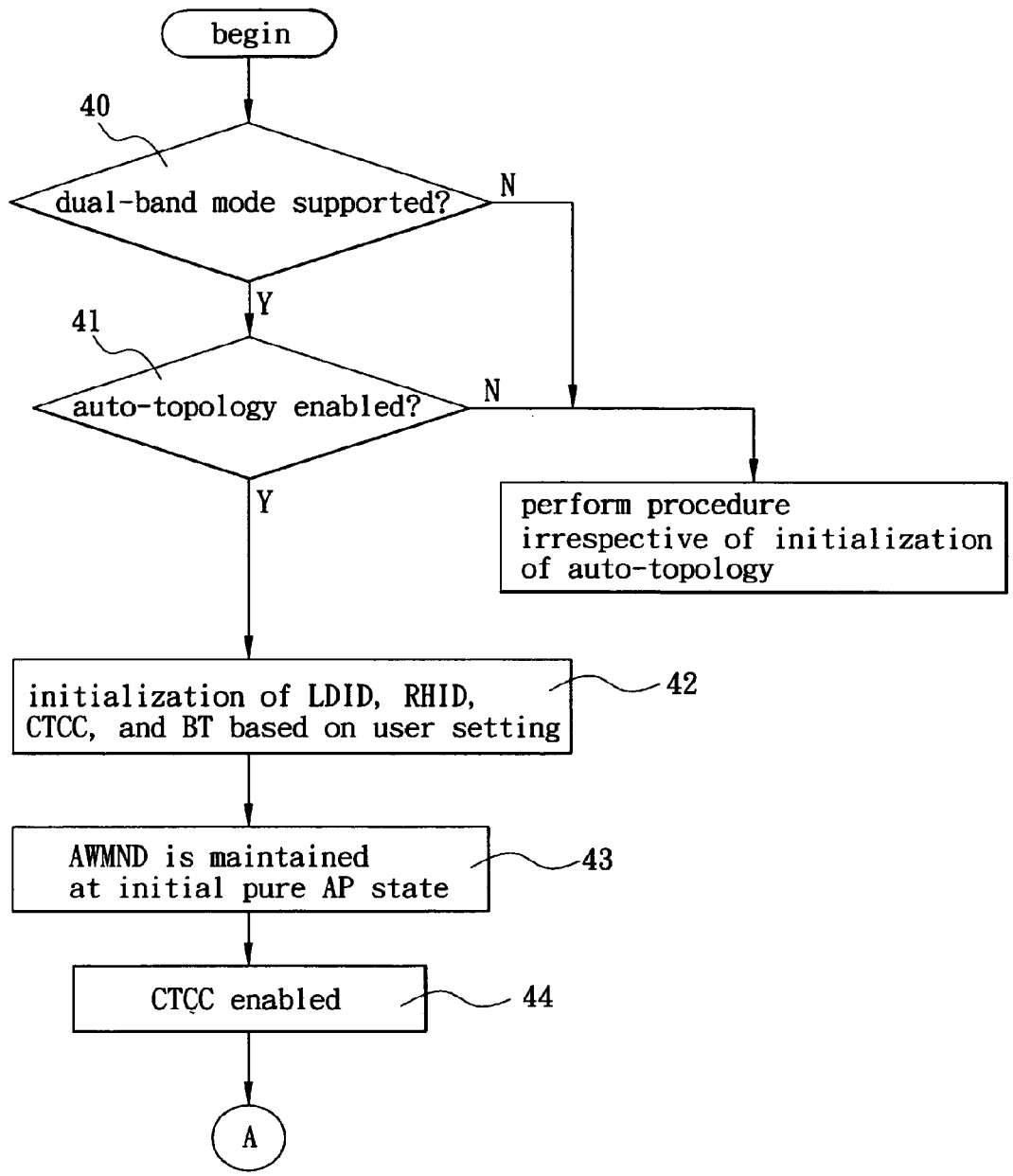
FIG. 4 presents an initialization algorithm in a flow chart in response to powering on AWMND according to a preferred embodiment of the invention.

Referring to FIG. 4, it presents an initialization algorithm in a process in response to powering on AWMND according to a preferred embodiment of the invention. The process comprises the following steps:

Step 40: It is determined whether a dual-band mode is supported. If yes, the process goes to step 41. Otherwise, the process performs a procedure irrespective of initialization of auto-topology. Steps of the invention are applicable to a dual-band mode. However, steps of the invention are not requisite in other modes.

Step 41: It is determined whether an auto-topology is enabled. If yes, the process goes to step 42. Otherwise, the process performs a procedure irrespective of initialization of auto-topology.

Step 42: An initialization of auto-topology is performed based on user setting in which LDID, RHID, CTCC, and BT databases are initialized.

Step 43: AWMND is maintained at an initial pure AP state depending on rules of state machine.

Step 44: Enables the initialized CTCC. Time of itself remaining in this state is counted and recorded. Regularly send a probe request frame based on the current state. Other devices remaining in this state are also recorded based on Hello IE of other received devices. Thus, state of itself is maintained.

Figure 5:
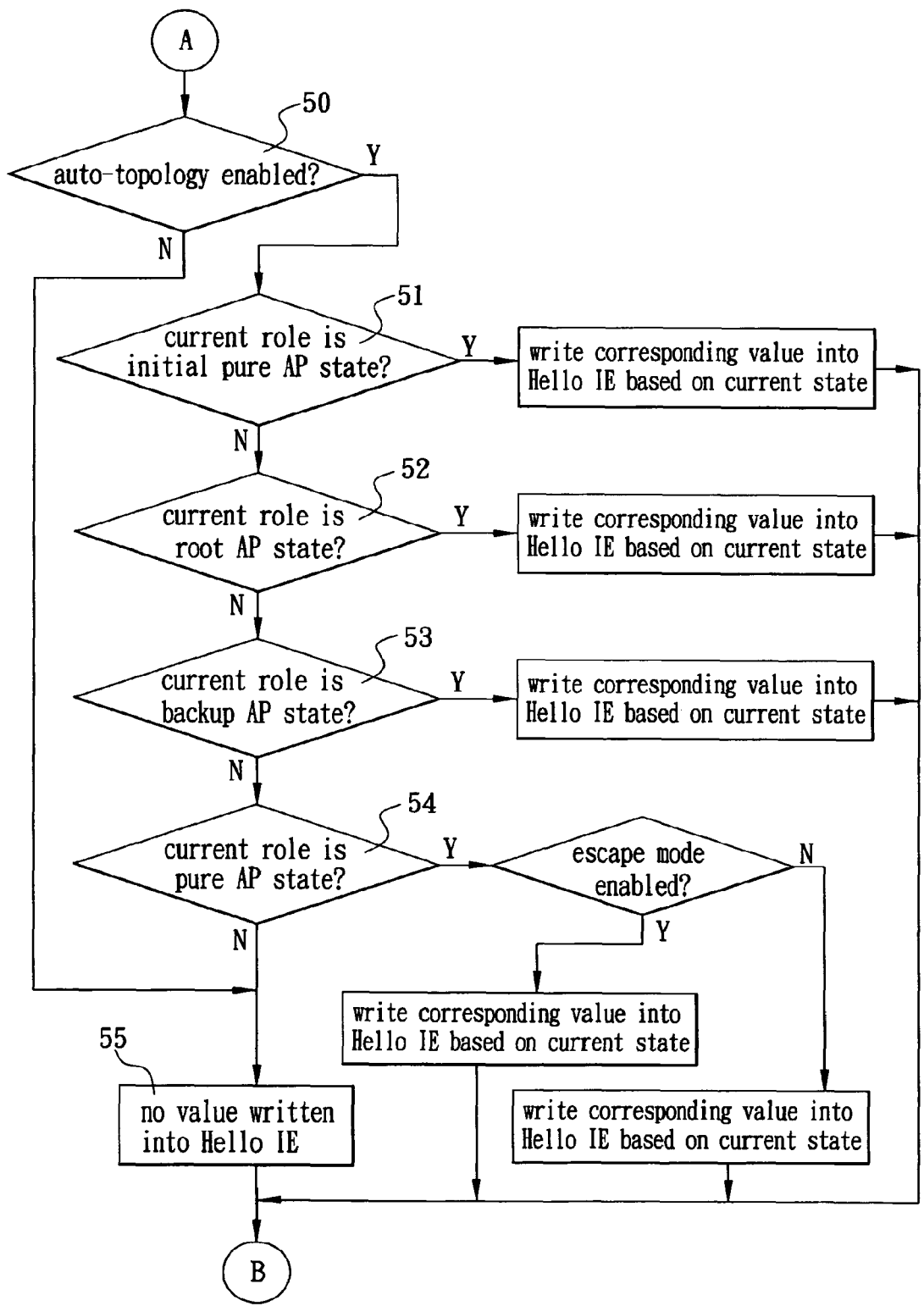
FIG. 5 is a continuation of FIG. 4 where AWMND initialization has been finished, a determination of the current role of AWMND is made before sending a probe request frame, the frame is transferred based on the role, and the probe request frame is eventually sent.

Referring to FIG. 5, it is a continuation of FIG. 4 in which AWMND initialization has been finished and a probe request frame begins to send. Moreover, a determination of the current role of AWMND is made and the frame is transferred based on the role before sending a probe request frame. The process comprises the following steps:

Step 50: It is determined whether an auto-topology is enabled. If yes, the process goes to step 52. Otherwise, the process jumps to step 55.

Step 51: AWMND determines its current internal status and external status based on real time information provided by LDID, RHID, CTCC, and BT. It is further determined by AWMND whether its current role is stably maintained in an initial pure AP state based on real time information provided by LDID, RHID, CTCC, and BT. If yes, write an appropriate value into Hello IE based on the current role. Otherwise, the process goes to step 52 based on rules of state transit requirement.

Step 52: It is determined whether the current role is in a root AP state. If yes, write value of a corresponding field into Hello IE by taking the current role as the root AP state. Otherwise, the process goes to step 53.

Step 53: It is determined whether the current role is in a backup AP state. If yes, write value of a corresponding field into Hello IE by taking the current role as the backup AP state and transfer the frame. Otherwise, the process goes to step 54.

Step 54: It is determined whether the current role is in a pure AP state. If not, the process goes to step 55. If yes, it is further determined whether an escape mode is enabled. If yes, write value of a corresponding field into Hello IE by taking the current role as the escape pure AP state. Otherwise, write value of a corresponding field into Hello IE by taking the current role as the pure AP state and transfer the frame.

Step 56: No value is written into Hello IE.

Figure 6:
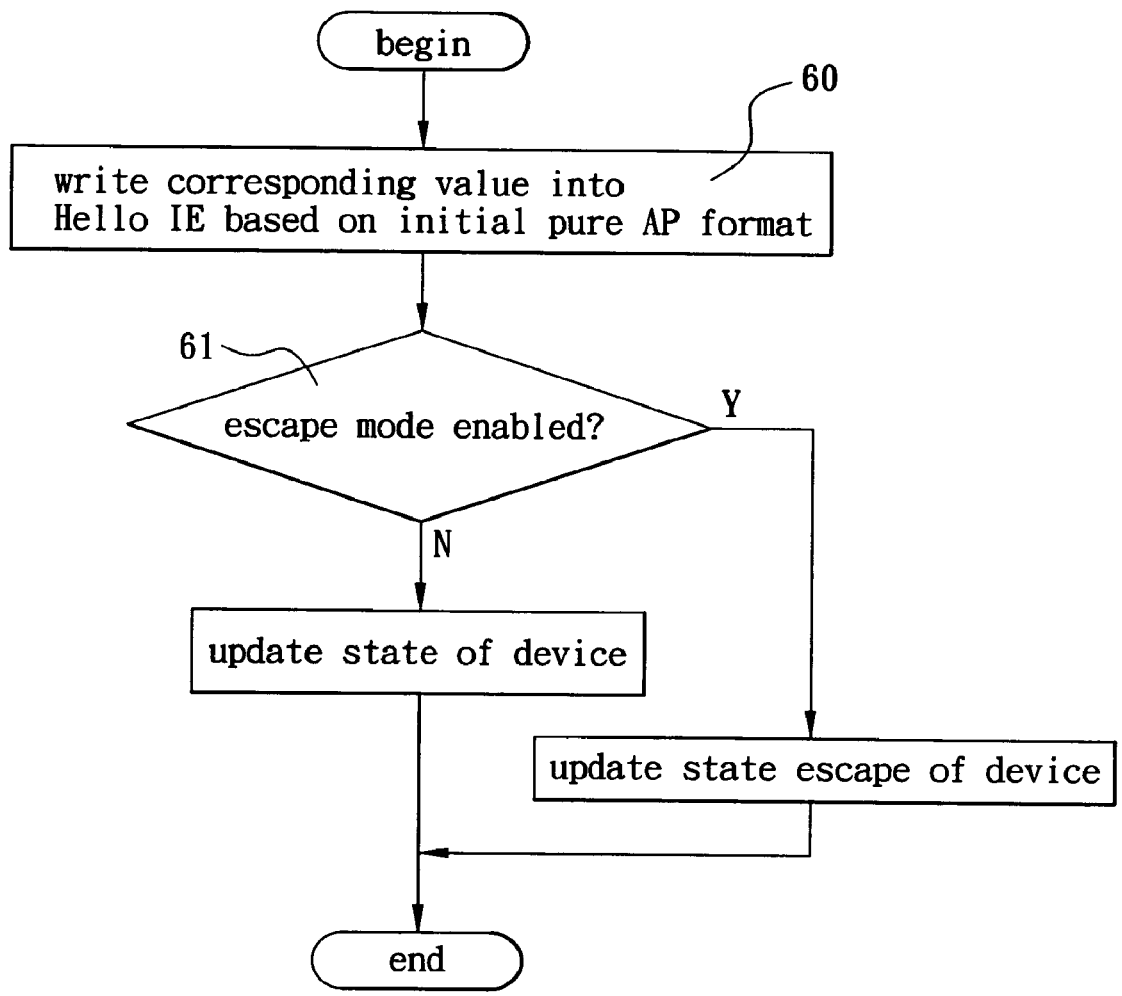
FIG. 6 presents a flow chart of writing corresponding values into fields of Hello IE after AWMND determining the current role is in an initial pure AP state.

Referring to FIG. 6, it presents a process of writing corresponding values into fields of Hello IE after AWMND determining the current role is in an initial pure AP state. The process comprises the following steps:

Step 60: Write corresponding values into corresponding fields of Hello IE based on an initial pure AP format.

Step 61: It is determined whether an escape mode provided by CTCC is enabled. If yes, update a state escape of device. Otherwise, update state of device.

Figure 7:
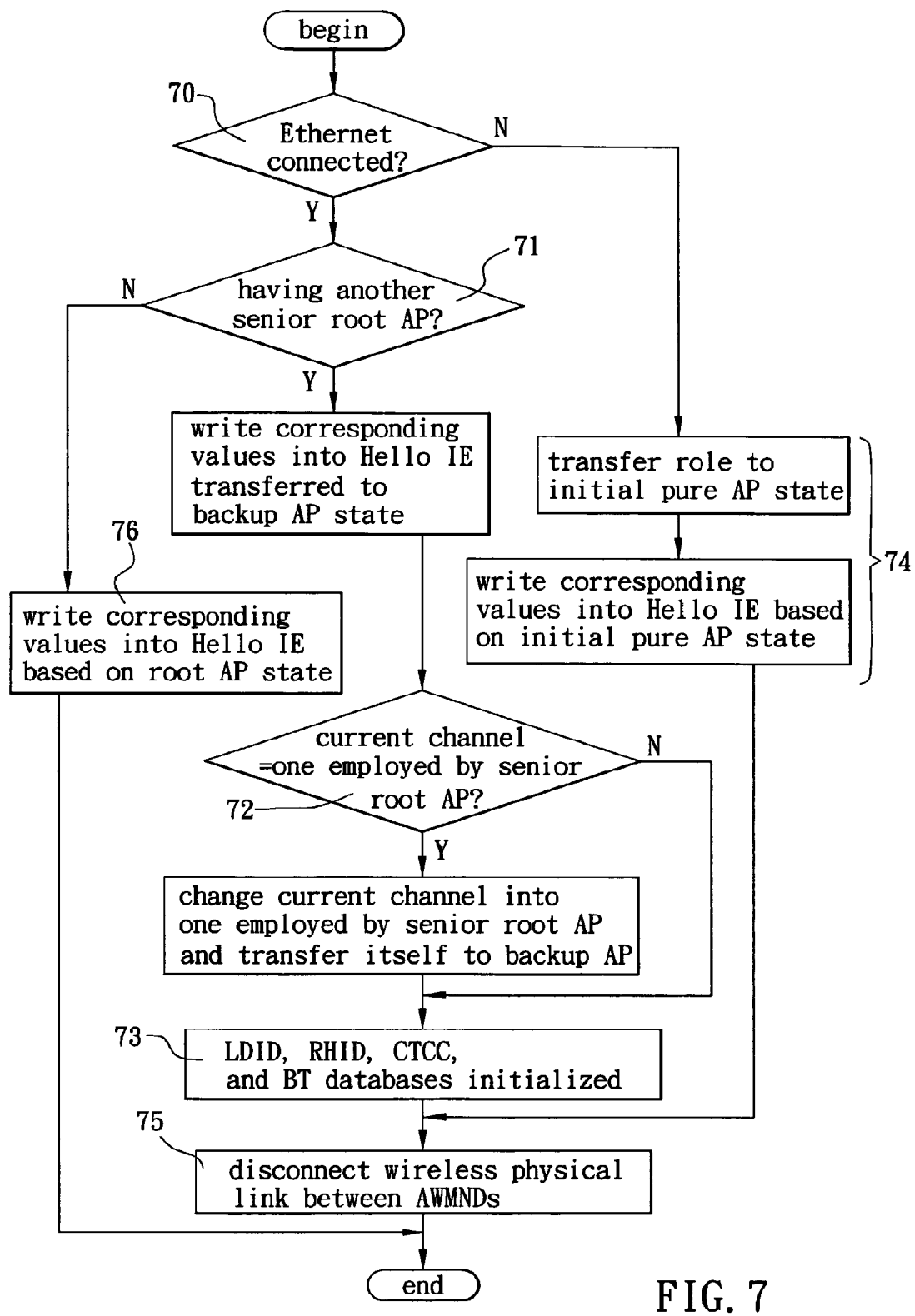
FIG. 7 presents a flow chart of writing corresponding values into fields of Hello IE after AWMND determining the current role is in a root AP state.

Referring to FIG. 7, it presents a process of writing corresponding values into fields of Hello IE after AWMND determining the current role is in a root AP state. The process comprises the following steps:

Step 70: It is determined whether Ethernet is connected. If yes, the process goes to step 71. Otherwise, the process jumps to step 74.

Step 71: It is determined whether there is a CGID field having value the same as that of AWMND and having a root AP more senior than AWMND. If yes, state is transferred to backup AP state (i.e., role of the current backup AP). Next, write corresponding values into fields of Hello IE based on rules of backup AP state. Otherwise, the process jumps to step 76.

Step 72: It is determined whether the current channel is the same as that employed by the existing senior root AP. If yes, change the current channel into the current channel employed by the senior root AP and transfer itself to a backup AP. Otherwise, the process goes to step 73.

Step 73: LDID, RHID, CTCC, and BT databases are initialized prior to jumping to step 75.

Step 74: Transfer role to an initial pure AP state prior to writing corresponding values into fields of Hello IE based on rules of initial pure AP state. Next, the process goes to step 75.

Step 75: Disconnect a wireless physical link between AWMNDs. The process ends normally.

Step 76: Write corresponding values into fields of Hello IE based on rules of root AP state. The process ends normally.

Figure 8:
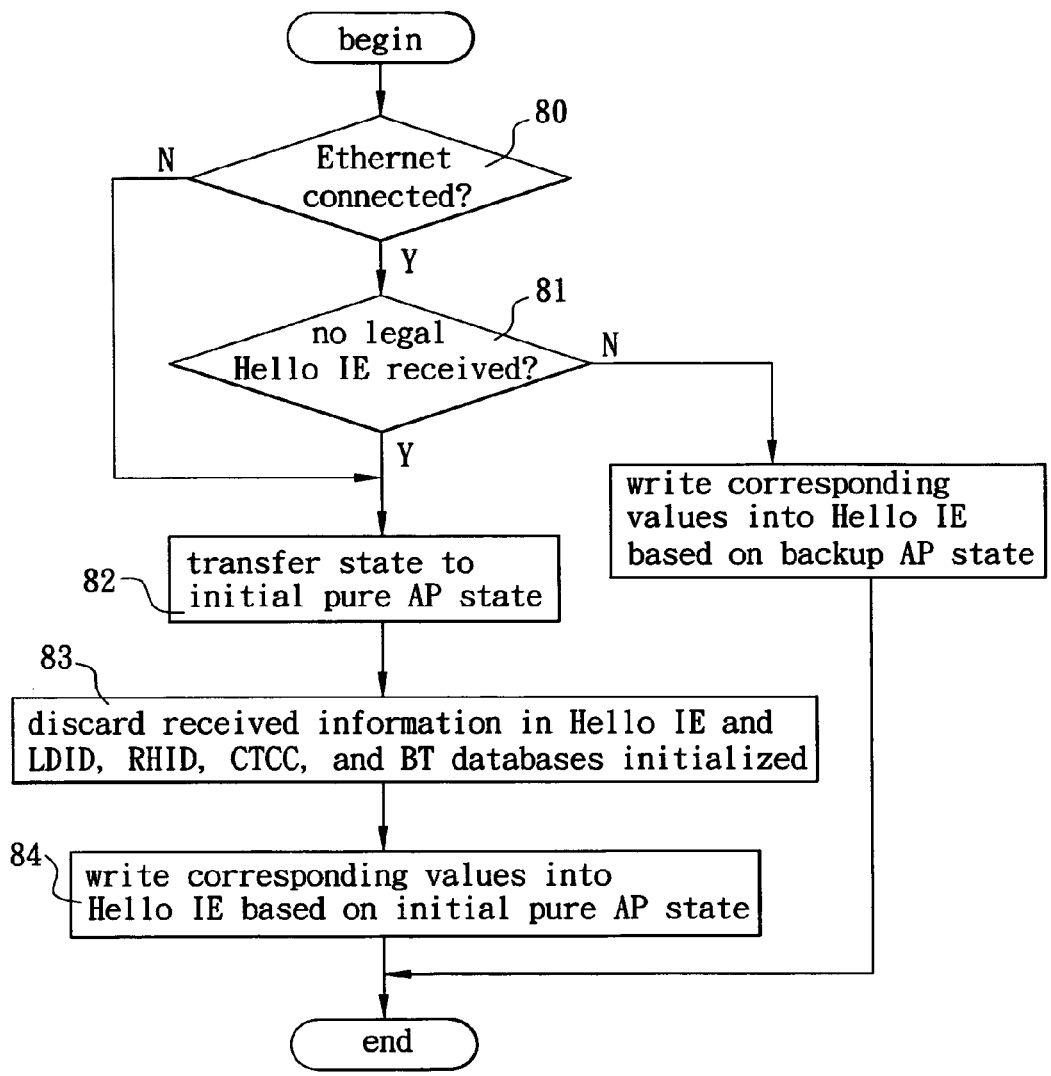
FIG. 8 presents a flow chart of writing corresponding values into fields of Hello IE after AWMND determining the current role is in a backup AP state.

Referring to FIG. 8, it presents a process of writing corresponding values into fields of Hello IE after AWMND determining the current role is in a backup AP state. The process comprises the following steps:

Step 80: It is determined whether Ethernet is connected. If yes, the process goes to step 81. Otherwise, the process jumps to step 82.

Step 81: It is determined whether no legal Hello IE is received by CTCC. That is, time of receiving Hello IE has exceeded a predetermined period of time. If yes, the process goes to step 82. Otherwise, write corresponding values into fields of Hello IE based on rules of backup AP state. The process ends normally.

Step 82: Transfer state to an initial pure AP state.

Step 83: Discard received information in Hello IE and LDID, RHID, CTCC, and BT databases are initialized.

Step 84: Write corresponding values into fields of Hello IE based on rules of initial pure AP state. The process ends normally.

Figure 9:
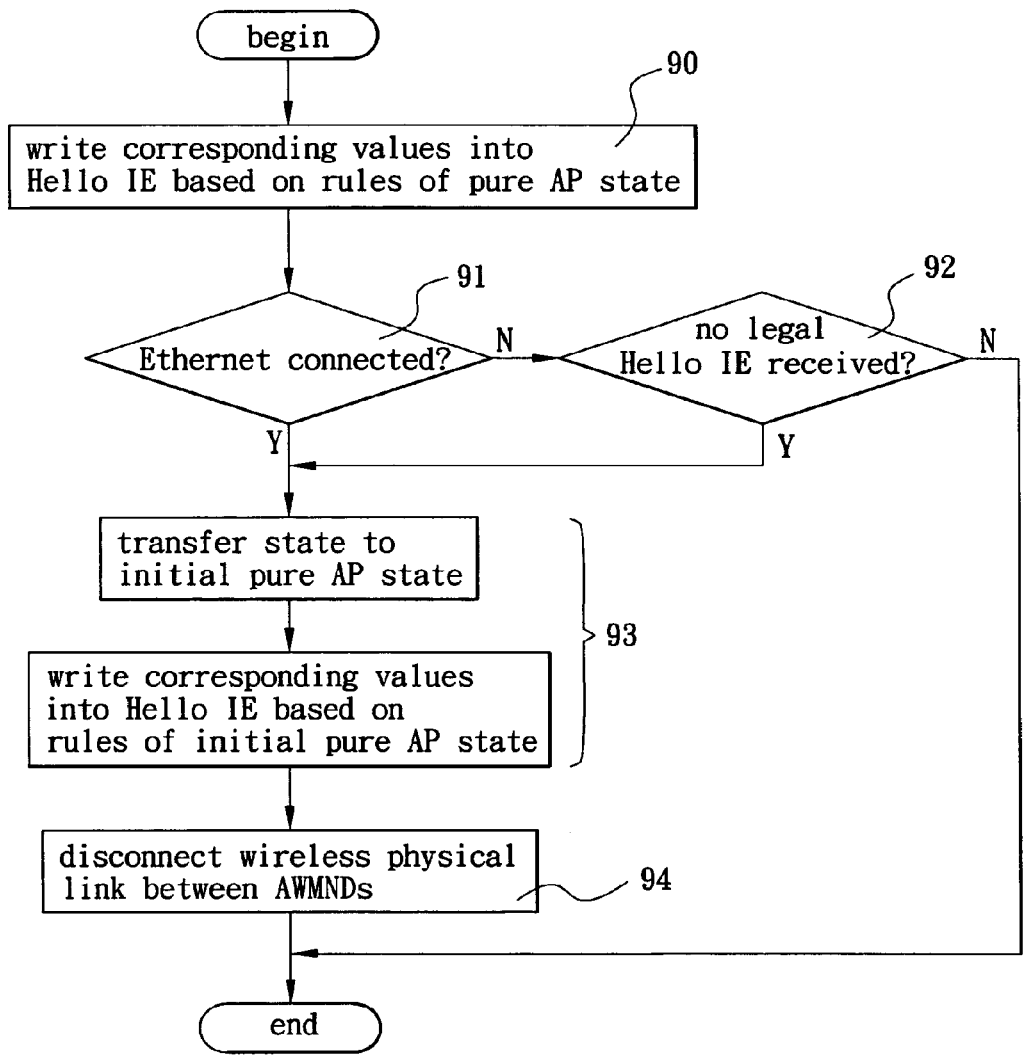
FIG. 9 presents a flow chart of writing corresponding values into fields of Hello IE after AWMND determining the current role is in a pure AP state.

Referring to FIG. 9, it presents a process of writing corresponding values into fields of Hello IE after AWMND determining the current role is in a pure AP state. The process comprises the following steps:

Step 90: Write corresponding values into fields of Hello IE based on rules of pure AP state.

Step 91: It is determined whether Ethernet is connected. If yes, the process jumps to step 93. Otherwise, the process goes to step 92.

Step 92: It is determined whether no legal Hello IE is received by CTCC. That is, time of receiving Hello IE has exceeded a predetermined period of time. If yes, the process goes to step 93. Otherwise, the process ends normally.

Step 93: Transfer state to an initial pure AP state. Write corresponding values into fields of Hello IE based on rules of initial pure AP state.

Step 94: Disconnect a wireless physical link between AWMNDs. The process ends normally.

Figure 10:
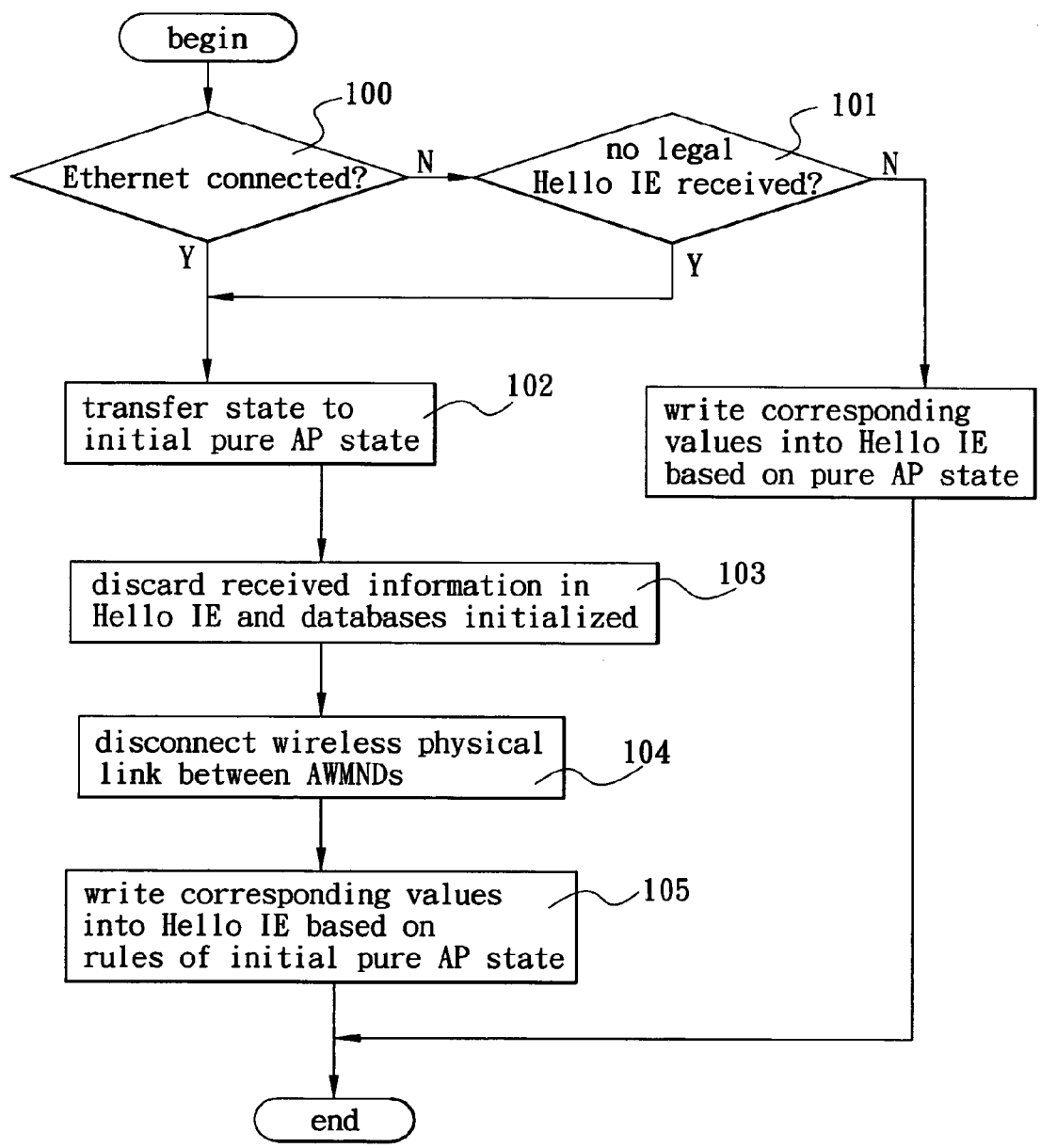
FIG. 10 presents a flow chart of writing corresponding values into fields of Hello IE after AWMND determining the current role is in an escape pure AP state.

Referring to FIG. 10, it presents a process of writing corresponding values into fields of Hello IE after AWMND determining the current role is in an escape pure AP state. The process comprises the following steps:

Step 100: It is determined whether Ethernet is connected. If yes, the process jumps to step 102. Otherwise, the process goes to step 101.

Step 101: It is determined whether no legal Hello IE is received by CTCC. That is, time of receiving Hello IE has exceeded a predetermined period of time. If yes, the process goes to step 102. Otherwise, write corresponding values into fields of Hello IE based on rules of pure AP state. The process ends normally.

Step 102: Transfer state to an initial pure AP state.

Step 103: Discard received information in Hello IE and LDID, RHID, CTCC, and BT databases are initialized.

Step 104: Disconnect a wireless physical link between AWMNDs.

Step 105: Write corresponding values into fields of Hello IE based on rules of initial pure AP state. The process ends normally.

Figure 11:
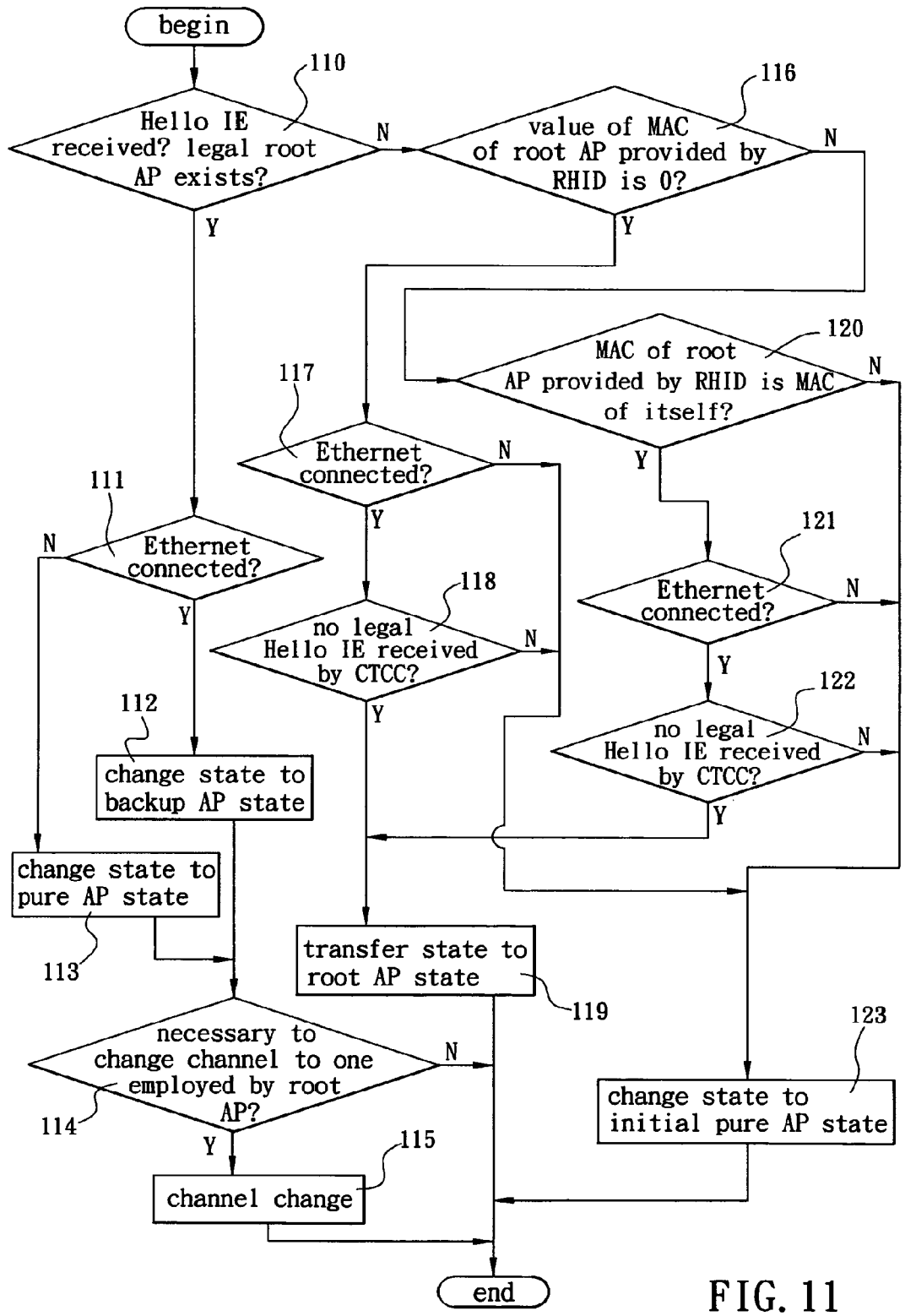
FIG. 11 presents a flow chart of updating device state after AWMND determining CTCC is in an initial pure AP mode and escape mode is not enabled based on information provided by CTCC.

Referring to FIG. 11, it presents a process of updating device state after AWMND determining an escape mode not enabled based on information provided by CTCC. The process comprises the following steps:

Step 110: It is determined whether Hello IE is received and RHID determines whether a legal root AP exists based on the current database. If yes, the process goes to step 111. Otherwise, the process jumps to step 112.

Step 111: It is determined whether Ethernet is connected. If yes, the process goes to step 112. Otherwise, the process jumps to step 113.

Step 112: Change state to backup AP state. The process jumps to step 114.

Step 113: Change state to pure AP state. The process goes to step 114.

Step 114: It is determined whether it is necessary to change channel to a channel employed by root AP. If yes, the process goes to step 115. Otherwise, the process ends normally.

Step 115: Perform channel change. The process ends normally.

Step 116: It is determined whether value of MAC of root AP provided by RHID is 0. If yes, the process goes to step 117. Otherwise, the process jumps to step 120.

Step 117: It is determined whether Ethernet is connected. If yes, the process goes to step 118. Otherwise, the process jumps to step 123.

Step 118: It is determined whether no legal Hello IE is received by CTCC. That is, time of receiving Hello IE has exceeded a predetermined period of time. If yes, the process goes to step 119. Otherwise, the process jumps to step 123.

Step 119: Transfer state to a root AP state. The process ends normally.

Step 120: It is determined whether MAC of root AP provided by RHID is MAC of itself. If yes, the process goes to step 121. Otherwise, the process jumps to step 123.

Step 121: It is determined whether Ethernet is connected. If yes, the process goes to step 122. Otherwise, the process jumps to step 123.

Step 122: It is determined whether no legal Hello IE is received by CTCC. That is, time of receiving Hello IE has exceeded a predetermined period of time. If yes, the process loops back to step 119. Otherwise, the process goes to step 123.

Step 123: Change state to an initial pure AP state. The process ends normally.

Figure 12:
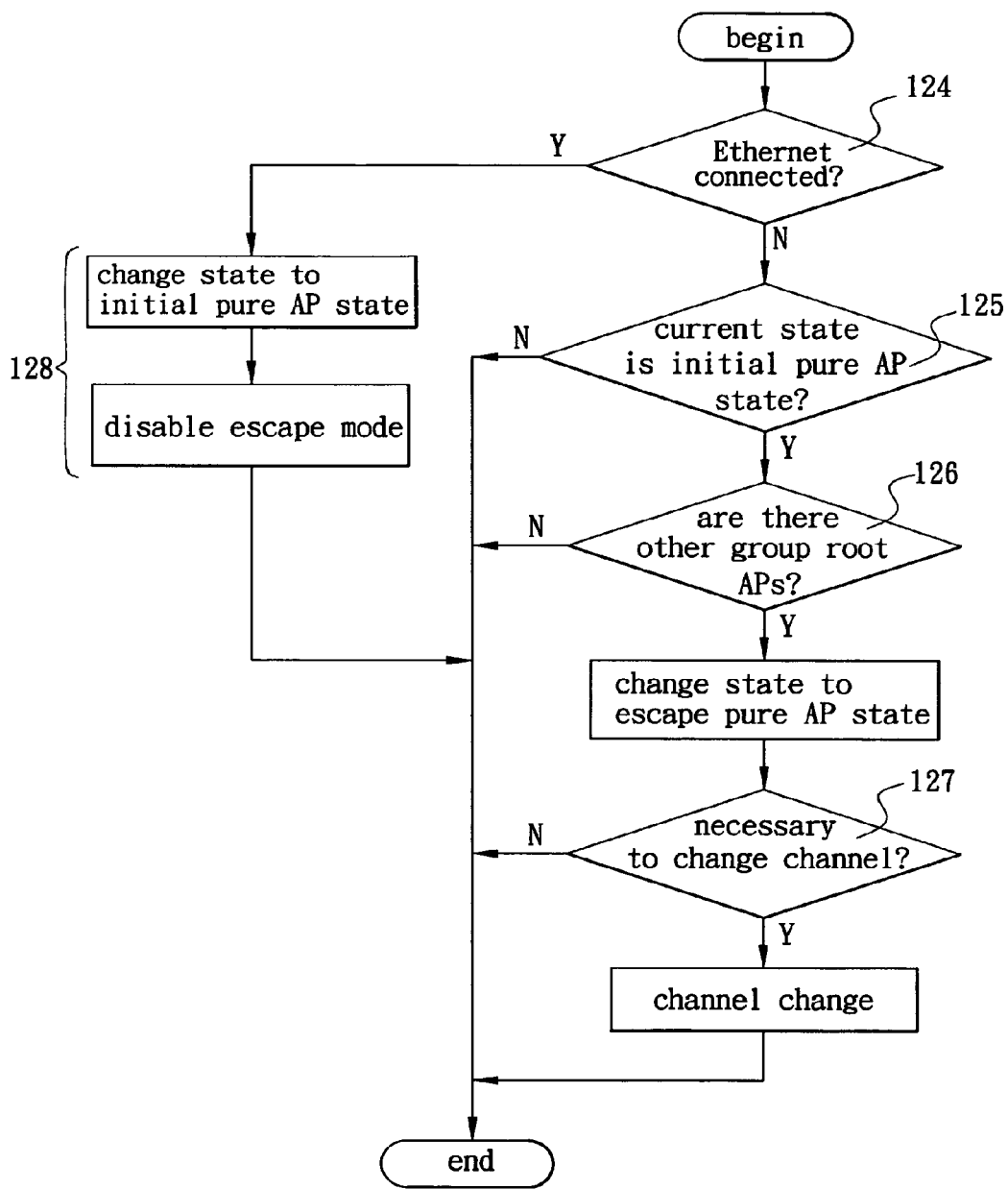
FIG. 12 presents a flow chart of updating device state escape after AWMND determining escape mode provided by CTCC is enabled.

Referring to FIG. 12, it presents a process of updating device state escape after AWMND determining escape mode provided by CTCC is enabled. The process comprises the following steps:

Step 124: It is determined whether Ethernet is connected. If yes, the process jumps to step 128. Otherwise, the process goes to step 125.

Step 125: It is determined whether the current state is an initial pure AP state. If yes, the process goes to step 126. Otherwise, the process ends normally.

Step 126: It is determined whether there are other group root APs as indicated by RHID. If yes, change state to an escape pure AP state prior to going to step 127. The process ends normally.

Step 127: It is determined whether it is necessary to change channel to a channel employed by root AP. If yes, perform channel change. The process ends normally. Otherwise, the process ends normally.

Step 128: Change state to an initial pure AP state and next disable the escape mode. The process ends normally.

Figure 13:
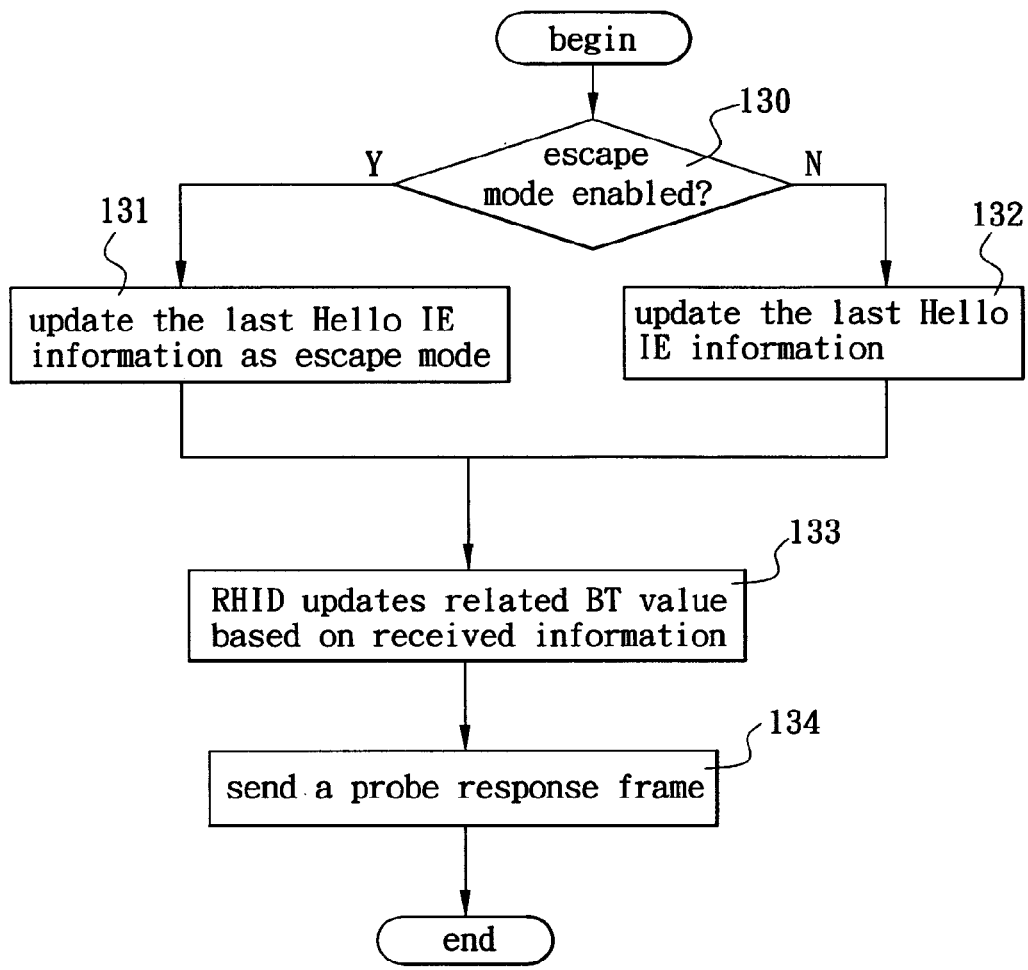
FIG. 13 presents a flow chart after AWMND determining that Hello IE in the probe request frame has been received.

Referring to FIG. 13, it presents a process after AWMND determining that Hello IE in the probe request frame has been received. The process comprises the following steps:

Step 130: It is determined whether an escape mode is enabled. If yes, the process goes to step 131. Otherwise, the process jumps to step 132.

Step 131: Update the last Hello IE information as an escape mode prior to going to step 133.

Step 132: Perform a procedure of updating the last Hello IE information prior to going to step 133.

Step 133: RHID updates related BT value based on received information.

Step 134: Send a probe response frame.

Figure 14:
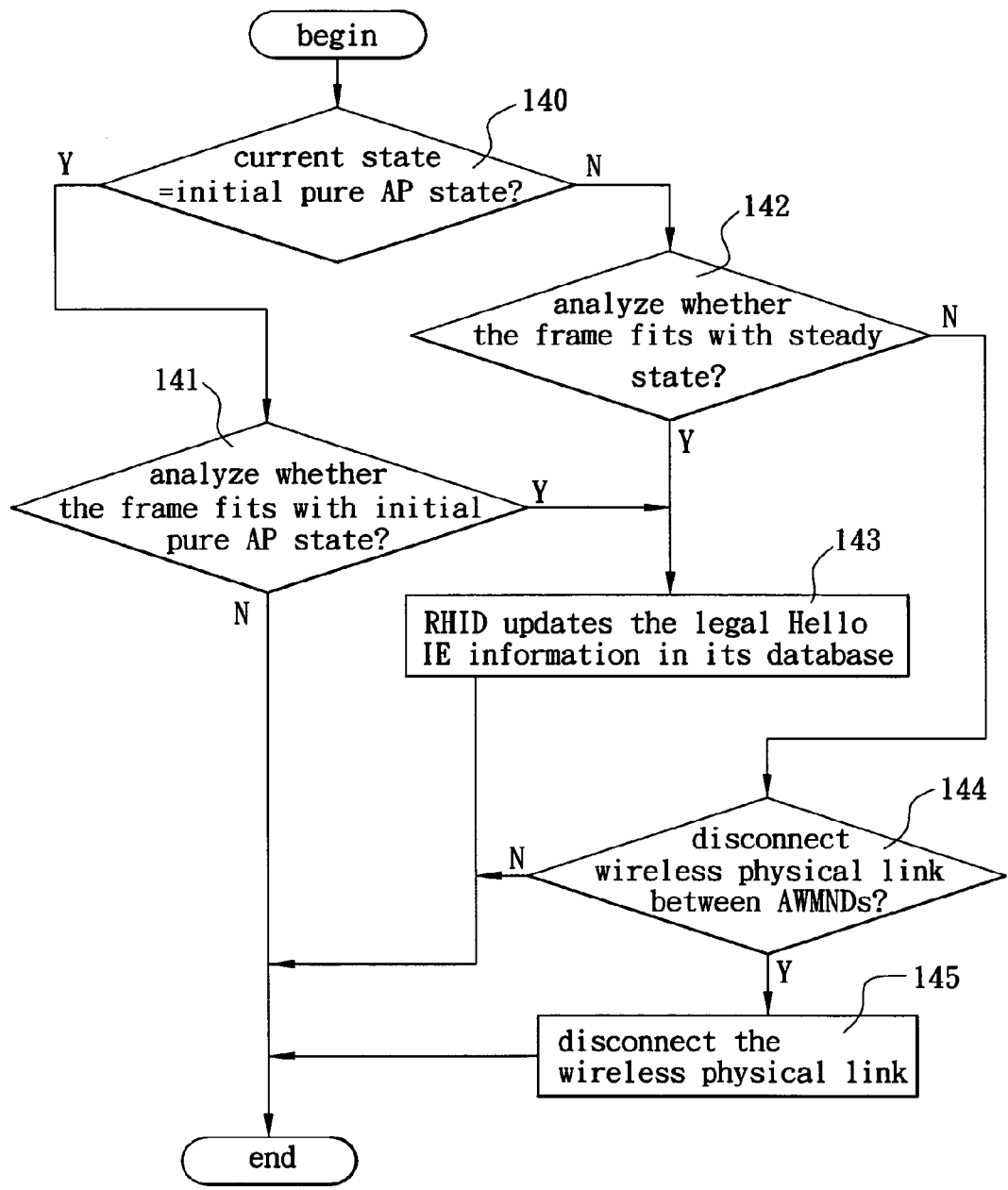
FIG. 14 presents a flow chart of AWMND updating latest received Hello IE.

Referring to FIG. 14, it presents a process of AWMND updating latest received Hello IE. The process comprises the following steps:

Step 140: It is determined whether the current state is an initial pure AP state. If yes, the process goes to step 141. Otherwise, the process jumps to step 142.

Step 141: Provide received Hello IE to RHID for analyzing whether the frame fits with the needs of initial pure AP state. If yes, the process jumps to step 143. Otherwise, the process ends normally.

Step 142: Provide received Hello IE to RHID for analyzing whether the frame fits with the needs of steady state. If yes, the process goes to step 143. Otherwise, the process jumps to step 144.

Step 143: RHID updates the legal Hello IE information in its database. The process ends normally.

Step 144: It is determined whether it is necessary to disconnect a wireless physical link between AWMNDs. If yes, the process goes to step 145. Otherwise, the process ends normally.

Step 145: Disconnect the wireless physical link between AWMNDs. The process ends normally.

In view of the above, the invention has the following characteristics and advantages.

1) Reduce the cost and complexity of network wiring and expansion. No limit is imposed by environment, resulting in a great reduction of the cost of wiring and wired network meshing topology establishment. Further, the invention has the feature of Layer 2 self-routing, resulting in an elimination of the cost of additionally installing a network switch. Furthermore, the invention is able to both expand a wired network and connect to a wireless network. That is, system of the invention is adapted to interconnect originally disconnected networks for expansion and integration purposes.

2) Coexistence with the original wired network. System of the invention overcomes incompatibility between original WDS and wired network such that the existing wired network is able to expand through the architecture of the invention. As a result, operating mode of WDS is not limited to a private single network.

3) Self-configuring. There is no need of manually setting devices in each link. As a result, complexity of network management is greatly reduced and thus network establishment is facilitated.

4) Self-forming and self-healing. System of the invention can automatically detect surrounding AWMNDs and is adapted to establish a physical link therewith. In a case of an AWMND disconnected or powered off, other AWMNDs can automatically detect it and disconnect the established physical link thereafter. That is, a physical link is established automatically as contemplated by the invention and a normal operation of the network is totally not adversely affected due to disconnection of any AWMND.

5) Layer 2 self-routing. AWMN and RSTP are able to carry out the effect of Layer 2 self-routing based on self-forming and self-healing.

6) Backup mechanism. AWMND provides a complete backup mechanism to allow two or more AWMNDs to access to the same network without looping. Also, data backup among AWMNDs connected to a wired network is made possible, resulting in an increase of reliability of a connection between a wireless network and a wired network and performance enhancement.

7) Performance of both wireless network and wired network increase. 5G bandwidth is employed by a backbone between one AP and another AP. 2.4G bandwidth is employed by a link between STA and AP. As such, channel of 2.4G employed by one AP can be separated from that employed by another AP. As a result, interference is avoided and performance thus is increased significantly.

While the invention herein disclosed has been described by means of specific embodiments, numerous modifications and variations could be made thereto by those skilled in the art without departing from the scope and spirit of the invention set forth in the claims.

What is claimed is:

1. A method for effecting a fast and automatic self-forming meshing topology integration with wired networks comprises:

applying a management frame in a wireless distribution system (WDS) mode;

adding an information element (IE) in the management frame such that a first wireless point (AP) is required to maintain the IE based on its own setting and state;

sending the IE by the first AP via the management frame for providing state of the first AP under the WDS mode;

enabling a second AP to be aware of conditions of the first APs in the WDS mode and to determine whether a physical link should be established therewith based on the received management frame; and carrying out a real time maintenance of said physical link if it has been established;

wherein in response to powering on the first AP, the first AP regularly broadcasts a probe request frame having a Hello IE, the probe request frame adapted to declare the first AP for supporting the system and to send out the first AP's current state in real time, and providing fields of the Hello IE as following:

a default group ID (DGID) for representing an AP having chance of highest priority of joining a predetermined group under the system;

a current group ID (CGID) for representing an AP joining a predetermined group under the system;

a default role (DR) for representing an AP having a chance of highest priority of playing a role in a predetermined group under the system;

a current role (CR) for representing an AP playing a predetermined role under the system; and an AP device name (ADN) for representing a device name of the AP.

2. The method of claim 1, further comprising:

enabling all other APs supporting the system to receive the probe request frame;

enabling each AP to analyze information provided by the Hello IE;

and storing real time information in a bridge table (BT), wherein at the same time a probe response frame is sent back as a reply to the probe request frame from the first AP after the second AP receiving the probe request frame, wherein a negotiation between the first and second APs is conducted, and wherein whether a wireless link between the first and second APs should be established is determined after finishing the negotiation.

3. The method of claim 2, wherein a probe request frame is sent between the first and the second APs regularly by broadcasting such that any two APs supporting the system are capable of determining whether a wireless link exists, and a new meshing topology is capable of being established via a rapid spanning tree protocol (RSTP).

4. The method of claim 3, wherein for enabling an alpha wireless meshing networking device (AWMND) to maintain its internal state and communicate via an alpha meshing element (AME) IE rather than sending an IE via any management frames, fields of the Hello IE further comprise:
  providing a local device information database (LDID) for storing state of an AP;
  providing a received hello information database (RHID) for storing latest and meaningful Hello IE sent from other APs;
  providing a counter and threshold counter center (CTCC) for maintaining a predetermined value and threshold, carrying out a fast negotiation between APs, and facilitating forming an AP topology effectively; and
  providing a bridge table (BT) for storing all received Hello IEs and site survey results.

\* \* \* \* \*